United States Patent
Kamiya et al.

(10) Patent No.: US 7,344,205 B2
(45) Date of Patent: Mar. 18, 2008

(54) PARKING ASSIST CONTROL APPARATUS AND STORAGE MEDIUM FOR PARKING ASSIST CONTROL PROGRAM

(75) Inventors: Kazuhiro Kamiya, Kariya (JP); Yukio Mori, Kariya (JP); Kazutaka Kato, Kariya (JP); Masahiro Matsuura, Kariya (JP)

(73) Assignee: Advics Co., Ltd, Aichi-pref. (JP)

( * ) Notice: Subject to any disclaimer, the term of this patent is extended or adjusted under 35 U.S.C. 154(b) by 330 days.

(21) Appl. No.: 11/137,397

(22) Filed: May 26, 2005

(65) Prior Publication Data

US 2005/0264099 A1   Dec. 1, 2005

(30) Foreign Application Priority Data

Jun. 1, 2004  (JP)  ............................ 2004-163067
Jun. 1, 2004  (JP)  ............................ 2004-163068

(51) Int. Cl.
*G06F 7/00*   (2006.01)
(52) U.S. Cl. ................... 303/124; 303/3; 701/36; 701/41
(58) Field of Classification Search .......... 303/3, 303/7, 15, 20, 124; 340/345, 346, 932.2; 701/28, 36, 41
See application file for complete search history.

(56) References Cited

U.S. PATENT DOCUMENTS

| | | | |
|---|---|---|---|
| 6,326,887 B1 * | 12/2001 | Winner et al. | 340/435 |
| 6,587,760 B2 * | 7/2003 | Okamoto | 701/1 |
| 6,654,670 B2 | 11/2003 | Kakinami et al. | |
| 6,683,539 B2 * | 1/2004 | Trajkovic et al. | 340/932.2 |
| 6,778,891 B2 * | 8/2004 | Tanaka et al. | 701/141 |
| 6,933,837 B2 * | 8/2005 | Gunderson et al. | 340/436 |
| 7,043,346 B2 * | 5/2006 | Kubota et al. | 701/28 |
| 7,053,795 B2 * | 5/2006 | Maemura et al. | 340/932.2 |
| 7,089,101 B2 * | 8/2006 | Fischer et al. | 701/41 |
| 7,155,325 B2 * | 12/2006 | Tanaka et al. | 701/36 |
| 2005/0240332 A1 * | 10/2005 | Mori et al. | 701/72 |
| 2005/0270177 A1 * | 12/2005 | Mori et al. | 340/932.2 |

* cited by examiner

Primary Examiner—Christopher P. Schwartz
(74) Attorney, Agent, or Firm—Posz Law Group, PLC

(57) ABSTRACT

When an abnormality is detected in a vehicle side device such as an obstacle sensor during parking assist control, a brake control ECU ends the parking assist control and outputs a control signal to warn the driver while forcibly stopping the vehicle by outputting a first drive signal to a hydraulic brake device and generating braking force.

12 Claims, 8 Drawing Sheets

PARKING ASSIST CONTROL APPARATUS AND STORAGE MEDIUM FOR PARKING ASSIST CONTROL PROGRAM

CROSS REFERENCE TO RELATED APPLICATION

This application is based upon and claims the benefit of Japanese Patent Application No. 2004-163067 filed on Jun. 1, 2004 and No. 2004-163068 filed on Jun. 1, 2004, the content of which are incorporated herein by reference.

FIELD OF THE INVENTION

The present invention relates to a parking assist brake control apparatus which applies braking force to wheels of a vehicle when assisting with parking of the vehicle.

RELATED ART OF THE INVENTION

In recent years, parking assist control apparatuses have been developed which execute a parking assist control that makes parking a vehicle easy by assisting with parking of the vehicle. For example, there is technology which, when a driver pushes a parking assist switch provided in a vehicle cabin, accordingly automatically moves the vehicle to a parking space and parks the vehicle without the driver having to do anything. There are also technologies, such as that disclosed in Japanese Patent Application Laid-Open No. 2000-280823, which indicate the path of vehicle travel during parking, and technologies which give instructions for operating the steering wheel, for example, such as "turn the steering wheel to the left" as the vehicle moves when parking into a garage and parallel parking. There is technology that executes parking assist brake control which brings the vehicle to an appropriate predetermined speed (such as a constant speed) while applying suitable braking force to the vehicle wheels by an automatic pressure increase system of existing technology when automatically moving the vehicle at this time. This kind of apparatus will be referred to as a parking assist brake apparatus.

When executing parking assist control in a parking assist brake control apparatus such as that described above, there is a possibility that an abnormality may occur in a vehicle side device such as a distance measuring sensor (such as corner sonar, laser radar, an on-board camera, or the like) used to execute the parking assist brake control, or that brake failure of an automatic pressure increase system may occur.

If such an abnormality occurs in the parking assist control apparatus of the related art, however, either no treatments are taken or the parking assist control is simply ended. Thus, in the event of an abnormality in a distance measuring sensor, braking force is unable to be automatically generated during the parking assist control and the vehicle may no longer be able to be moved at an appropriate predetermined speed (i.e., creep speed). It is therefore desirable that a failsafe function capable of responding in a case where an abnormality has occurred in a distance measuring sensor be provided in the parking assist control apparatus.

Further, in the event of brake failure, there is a possibility that braking force may be unable to be automatically generated during parking assist control and the vehicle may no longer be able to be moved at the appropriate predetermined speed. In this case, a warning is issued to the driver, urging the driver to take appropriate action, i.e., perform a brake operation. It is therefore desirable that a failsafe function capable of responding in a case where brake failure has occurred be provided in the parking assist brake control apparatus.

Incidentally, a sensor check is performed for approximately three seconds, for example, during an initial check after the ignition switch is turned on, and then performed regularly thereafter at predetermined cycles. Then, if an abnormality is detected, the driver is alerted to the fact that a distance measuring sensor has failed by the illumination of a warning lamp, for example. Because an abnormality of the distance measuring sensor may also occur when the vehicle is running at high speeds, however, no brake control is performed even if an abnormality occurs in a distance measuring sensor.

Also, in the parking assist brake control apparatus, during the initial check after the ignition switch has been turned on, a hardware abnormality check may also be performed by trial operation an electromagnetic valve provided in an automatic pressure increase system for applying brake pressure in the parking assist brake control apparatus. In this case as well, however, only an electrical abnormality check of the automatic pressure increase system is performed in the check immediately before parking assist brake control is executed; a hardware abnormality check is not performed. Thus, it is possible that a hardware abnormality may occur during parking assist brake control.

SUMMARY OF THE INVENTION

The present invention thus provides a parking control brake control apparatus capable of responding in a case in which an abnormality has occurred in a vehicle side device used in parking brake control when parking assist brake control is executed.

According to a first aspect of the present invention, when an abnormality detection unit detects an abnormality in a vehicle side device used in executing parking assist mode control, a vehicle brake control mechanism executes speed control on a vehicle by outputting an instruction signal to a braking force apply mechanism and generating braking force.

In this way, when an abnormality occurs in a vehicle side device during parking assist control, speed control of the vehicle is executed. It is thus possible to realize a parking assist control apparatus provided with a failsafe function that is able to respond to an abnormality, if one is detected, in the vehicle side device when parking assist control is executed.

For example, when the sensor abnormality detection unit detects an abnormality in a distance measuring sensor provided in the vehicle, the vehicle brake control mechanism stops the vehicle, irrespective of an intention of a driver, by outputting an instruction signal to a braking force apply mechanism that applies braking force to wheels provided on the vehicle and generating braking force.

Further, in this case, it is also possible to change whether or not to output the instruction signal to the braking force apply mechanism and generate braking force depending on the location of the abnormality in the distance measuring sensor.

According to this structure, it is possible to have the parking assist control continue depending on the location of the abnormality in the distance measuring sensor.

For example, of the distance measuring sensors, when an abnormality has been detected in a distance measuring sensor which is positioned on the opposite side from the vehicle traveling direction, it is possible to have an instruction signal not be output to the braking force apply mechanism.

Also, of the distance measuring sensors, when an abnormality is detected in a distance measuring sensor that is positioned on the opposite side from the vehicle traveling direction and on a side of the vehicle where the wheels are on the inside of a turn, it is also possible to have the instruction signal not be output to the braking force apply mechanism. This structure makes it possible to execute parking assist control that takes into account the fact that the vehicle body corresponding to an outside wheel of the turn on the opposite side from the vehicle traveling direction sticks out from the path of travel of the leading edge portion of the vehicle in the travel direction of the vehicle.

It is also possible to provide a parking assist system which includes the parking assist control apparatus according to the first aspect of the present invention. Thus it is possible to provide the parking assist control apparatus according to the first aspect of the present invention in a parking assist control system, and have the same effects as those described above be achieved with this parking assist control system.

Further, in order to control the speed of the vehicle during parking assist brake control, when the abnormality detection unit detects an abnormality in a first brake mechanism which applies braking force to the wheels provided on the vehicle, the vehicle brake control mechanism either runs the vehicle at a predetermined speed or stops the vehicle, irrespective of the intention of the driver, by outputting an instruction signal to a second brake mechanism which is different than the first brake mechanism and generating braking force.

In this case, it is possible to change whether to output an instruction signal to the second brake mechanism and generate braking force, or generate braking force by the first brake mechanism without outputting an instruction signal to the second brake mechanism, depending on the location of the abnormality of the first brake mechanism. Accordingly, it is possible to have the parking assist brake control continue depending on the location of the abnormality in the first brake mechanism.

For example, when the first brake mechanism is structured so as to apply braking force dividing the wheels provided on the vehicle into two brake systems, and the location of the abnormality of the first brake mechanism is in only one of those two brake systems, it is possible to have the first brake mechanism generate braking force and continue the parking assist brake control.

When an abnormality has occurred in both brake systems of the first brake mechanism, an instruction signal may also be output to the second brake mechanism and braking force be generated by the second brake mechanism.

The second brake mechanism in the vehicle brake control mechanism here can be an electric parking brake, for example.

In the first aspect of the present invention, a target deceleration detecting portion may obtain a target deceleration from data indicative of the vehicle speed, and the vehicle brake control mechanism may control the braking force applied to the vehicle wheels and output an instruction signal so that the target deceleration obtained by the target deceleration detecting portion is achieved.

By setting a target deceleration suitable for the vehicle speed and stopping the vehicle in this way, the vehicle can be prevented from stopping suddenly. In this case, similar effects as those described above can be achieved also by outputting an instruction signal from a vehicle brake control mechanism so that a deceleration increase gradient obtained by a deceleration increase gradient detection unit can be achieved.

The first aspect of the present invention is not limited to being realized in the form of a parking assist control apparatus. For example, the present invention may also be realized in the form of a parking assist control program or a recording medium thereof, or may be realized in another form such as a parking assist control method or the like.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
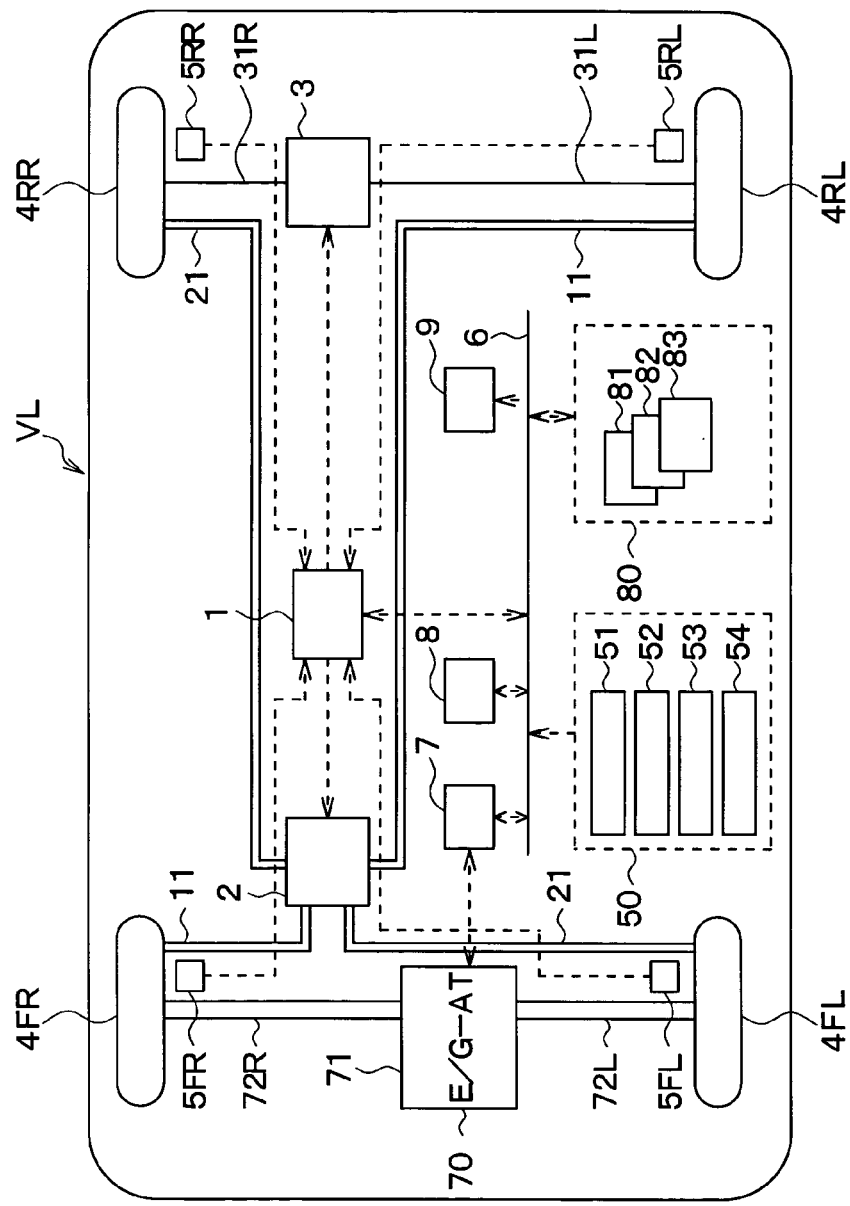
FIG. 1 is a block diagram of a parking assist control apparatus according to a first embodiment of the present invention.

The present invention will be described further with reference to various embodiments in the drawings.

First Embodiment

A parking assist control apparatus mounted in a vehicle to which a first embodiment of the present invention is applied will now be described with reference to the appended drawings.

FIG. 1 is a diagram of the overall configuration of a parking assist brake apparatus according to the present embodiment. In the drawing, the structural elements corresponding to a right front wheel, a left front wheel, a right rear wheel, and a left rear wheel of a vehicle VL are denoted by reference characters FR, FL, RR, and RL, respectively.

The parking assist control apparatus according to the present embodiment includes a brake control ECU 1, a hydraulic brake unit 2, an electric automatic parking brake (hereinafter simply referred to as "PKB") 3, wheel cylinders (hereinafter simply referred to as "W/C") 41FR, 41RL, 41FL, and 41RR provided on corresponding vehicle wheels 4FR, 4RL, 4FL, and 4RR, wheel speed sensors 5FR, 5RL, 5FL, and 5RR, an in-vehicle LAN bus 6, an engine ECU 7, a peripheral monitoring control ECU 8, a warning indication and alarm device 9, various sensors 50, and a brake request output portion 80.

Of these structural elements, the brake control ECU 1, the engine control ECU 7, the peripheral monitoring control ECU 8, the warning indication and alarm device 9, the various sensors 50, and the brake request output portion 80 are each connected to the in-vehicle LAN bus 6, through which they transmit and receive signals to and from each other.

The brake control ECU 1 is a computer which inputs a brake request from the brake request output portion 80 and the peripheral monitoring control ECU 8, and sensor signals from the wheel speed sensors 5FR, 5RL, 5FL, and 5RR, and the various sensors 50 via the in-vehicle LAN bus 6, as well as outputs control signals to the engine control ECU 7 and driving signals for controlling the PKB 3 and the hydraulic brake unit 2, to be described later, via the in-vehicle LAN bus 6.

In the present embodiment, the hydraulic brake unit 2 and the PKB 3 correspond to braking force apply mechanisms in the present invention, and form an automatic brake system.

Figure 2:
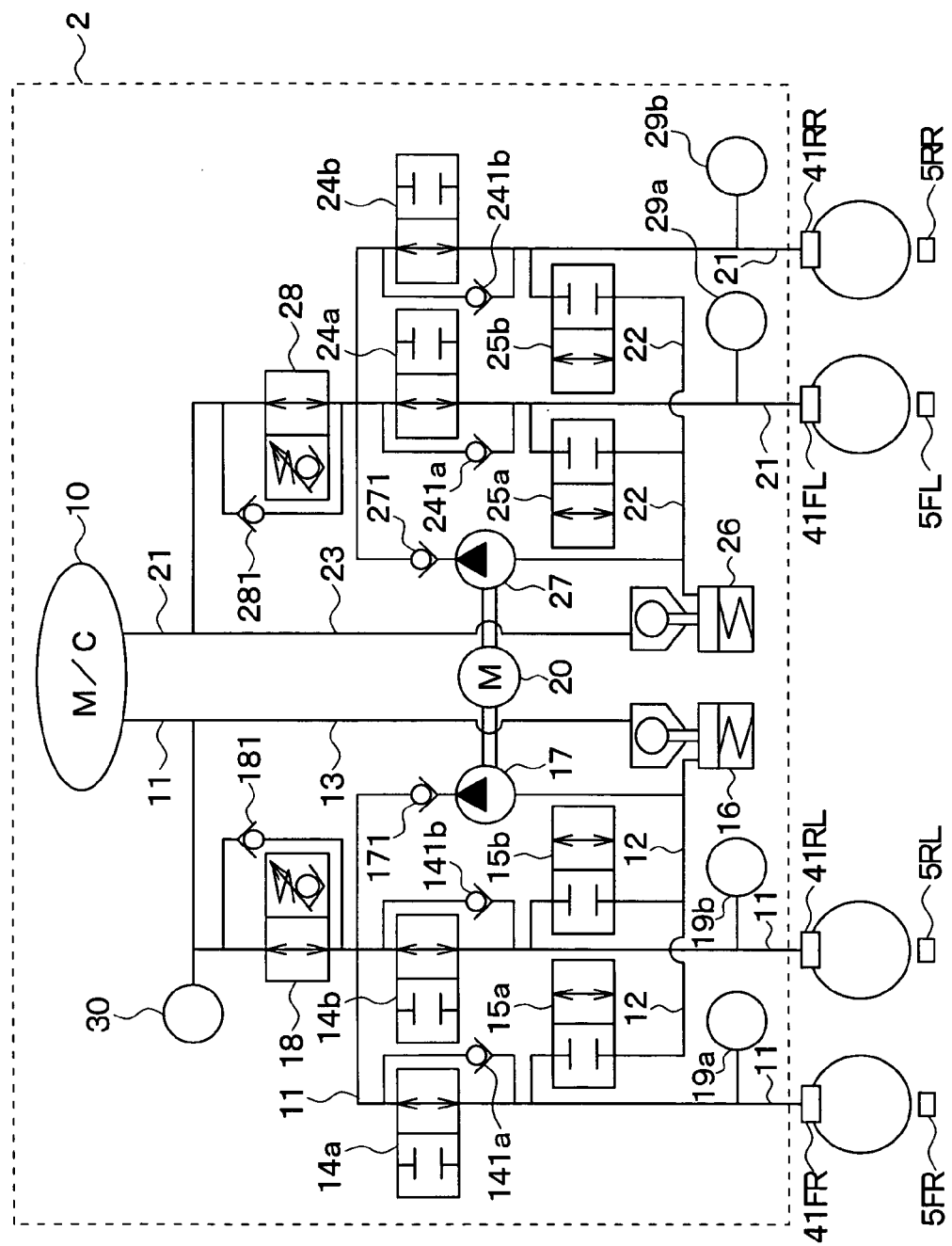
FIG. 2 is a view illustrating the configuration of hydraulic brakes provided in the parking assist control apparatus.

FIG. 2 is a diagram illustrating the specific configuration of the lines of the hydraulic brake unit 2. The hydraulic brake unit 2 will now be described with reference to this drawing.

When a driver depresses a brake pedal, not shown, a master cylinder (hereinafter simply referred to as "M/C") 10 generates a M/C pressure according to the depression force of the brake pedal detected by a brake operating value sensor 53, to be described later, which is one of the various sensors 50. A first brake system 11 and a second brake system 21 are connected to the M/C 10. The brake systems 11 and 21 are set up so that they are diagonally connected to the W/C 41FR, the 41RL, the 41FL, and the 41RR, i.e., the first brake system 11 is connected to the W/C 41FR and 41RL, while the second brake system 21 is connected to the W/C 41FL and 41RR.

Brake fluid pressure generated by the M/C 10 is transmitted to the W/C 41FR and 41RL provided on the corresponding vehicle wheels via the first brake system 11, as well as to the W/C 41FL and 41RR provided on the corresponding vehicle wheels via the second brake system 21, such that a first braking force is generated.

The following description focuses on the first brake system 11, more particularly, the brake system related to the right front wheel 4FR. The other vehicle wheels and the second brake system are similar.

Pressure increase control valves 14a and 14b are provided in the first brake system 11 for increasing and maintaining the pressure in the W/C 41FR and 41RL during ABS control of the right front wheel 4FR and the left rear wheel 4RL, respectively. Check valves 141a and 141b are provided in parallel with the pressure increase control valves 14a and 14b, respectively, such that if the W/C pressure becomes excessive when the pressure increase control valves 14a and 14b are closed, the hydraulic fluid can escape to a side of the M/C 10.

Pressure decrease control valves 15a and 15b for decreasing and maintaining the pressure in the W/C 41FR and 41RL during ABS control are provided in a pressure decrease line 12 which extends from between the pressure increase control valves 14a and 14b and the W/C 41FR and 41RL. This pressure decrease line 12 is connected to a reservoir 16.

Brake fluid stored in the reservoir 16 is sucked up by a pump 17 driven by a motor 20, after which it is delivered between the pressure increase control valves 14a and 14b and a master cut-off valve (hereinafter simply referred to as "SM valve") 18, which will be described later. A check valve 171 is provided at a discharge port of the pump 17 to prevent high brake fluid pressure from being applied to the discharge port of the pump 17.

The SM valve 18 is arranged between the M/C 10 and the pressure increase control valves 14a and 14b. This SM valve 18 is a two-position valve which is opened when de-energized and closed by a check valve in the direction shown in the drawing when energized. When in a closed state, the SM valve 18 releases when the pressure on a side of the W/C 41FR and 41RL becomes greater than a side of the pressure on the M/C 10 by a cracking pressure of a spring of the check valve, so that pressure can escape. A check valve 181 is provided in parallel with the SM valve 18, which only allows fluid to flow from the side of the M/C 10 to the side of the W/C 41FR and 41RL side.

The reservoir 16 is connected between the M/C 10 and the SM valve 18 by a suction line 13.

A hydraulic pressure sensor 30 is provided between the M/C 10 and the SM valve 18 in the first brake system 11 so that the brake fluid pressure generated by the M/C 10 can be detected. The brake fluid pressure detected by this hydraulic pressure sensor 30 is a pressure generated in a secondary chamber, not shown, of the M/C 10, but since the same pressure is also generated in a primary chamber to which the second brake system 21 is connected, the hydraulic pressure sensor 30 is effectively able to detect the M/C pressure.

Also, hydraulic pressure sensors 19a and 19b are provided between the pressure increase control valves 14a and 14b and the W/C 41FR and 41RL so that the respective W/C pressures can be detected.

Output signals from the hydraulic pressure sensor 30 and the hydraulic pressure sensors 19a and 19b are input to the brake control ECU 1.

The pressure increase control valves 14a and 14b and the pressure decrease control valves 15a and 15b are all two-position valves. When the valves are de-energized (i.e., OFF), such as when the brake pedal is not being operated and during normal braking, the positions of the valve bodies are as shown in the drawing, i.e., the pressure increase control valves 14a and 14b are opened and the pressure decrease control valves 15a and 15b are closed. Also, when de-energized, as is the case during normal operation, the position of the valve body of the SM valve 18 is as shown in the drawing, i.e., the valve is opened.

These control valves are all driven in response to operating signals from the brake control ECU 1. Also, the motor 20 that drives the pump 17 and a pump 27 is also driven in response to operating signals from the brake control ECU 1.

These operating signals to the hydraulic brake unit 2 as a whole correspond to a first drive signal. Also, stopping control (i.e., prohibiting control) of the hydraulic brake unit 2 means setting the first drive signal to zero (i.e., a non-operating state). More specifically, stopping control of the hydraulic brake unit 2 means de-energizing all of the pressure increase control valves 14a, 14b, 24a, and 24b, the pressure decrease control valves 15a, 15b, 25a, and 25b, and the SM valves 18 and 28, and setting the drive current of the motor 20 to zero. Accordingly, in the first brake mechanism illustrated by the hydraulic brake unit 2, when the first drive signal is cancelled, the braking force is also cancelled (i.e., the braking force becomes zero).

Continuing on, the basic control method of this hydraulic brake unit 2 will now be described.

During normal brake operation when the brake pedal is depressed by the driver, all of the control valves (i.e., the SM valve 18, the pressure increase control valve 14a, and the pressure decrease control valve 15a) are de-energized (i.e., OFF). Therefore, the M/C pressure is used for the W/C 41FR and 41RL, such that the W/C pressure equals the M/C pressure.

During ABS control, the operations in the process to decrease the W/C pressure in order to avoid tire lock differ from the operations in the process to increase the W/C pressure in order to recover braking force. During ABS control, the SM valve 18 is normally OFF (i.e., opened state) and the pump 17 is driven to suck up brake fluid from the reservoir 16.

First, in the pressure decrease process of ABS control, the pressure increase control valve 14a is energized (that is, turned ON), i.e., in a closed state, and ON/OFF duty ratio control is performed on the pressure decrease control valve 15a. Accordingly, the pressure decrease control valve 15a is repeatedly switched between opened and closed such that brake fluid flows from the W/C 41FR to the reservoir 16 and the W/C pressure decreases at a predetermined change gradient.

In the pressure increase process of ABS control, the pressure decrease control valve 15a is de-energized (that is, turned OFF), i.e., in a closed state, and OFF/ON duty ratio control is performed on the pressure increase control valve 14a. Accordingly, the pressure increase control valve 14a is repeatedly switched between opened and closed such that brake fluid is supplied from the M/C 10 to the W/C 41FR and the W/C pressure increases.

Next, the pressure increase process and pressure decrease process during a brake operation assigned to the hydraulic brake unit 2 by the brake control ECU 1 based on a brake request signal from the brake request output portion 80 and the peripheral monitoring control ECU 8 irrespective of whether the brake pedal is being depressed will be described.

In the pressure increase process, the SM valve 18 is turned ON (i.e., is closed) and the pressure decrease control valve 15a is turned OFF (i.e., is closed). Also, in a condition where discharge pressure has been generated by driving the pump 17 and sucking up brake fluid from the reservoir 16, the W/C pressure is increased at a predetermined change gradient or until a set target pressure by performing OFF/ON duty ratio control on the pressure increase control valve 14a while performing a comparison with a detection value from the hydraulic pressure sensor 19a. At this time, brake fluid is replenished from the M/C 10 to a suction port of the pump 17 via the suction line 13 and the reservoir 16 as necessary.

Also, in the pressure decrease process, the SM valve 18 is turned ON (i.e., is closed) and the pressure increase control valve 14a is turned ON (i.e., is closed). Further, in a condition where discharge pressure has been generated by driving the pump 17 and sucking up brake fluid from the reservoir 16, the W/C pressure is decreased by drawing brake fluid from the W/C 41FR at a predetermined gradient or until a set target pressure by performing ON/OFF duty ratio control on the pressure decrease control valve 15a while performing a comparison with a detection value from the hydraulic pressure sensor 19a. At this time, the discharge pressure of the pump 17 increases because the pressure increase control valve 14a and the SM valve 18 are both closed. If that pressure becomes greater than the cracking force of the spring of the check valve of the SM valve 18, however, it is released and the pressure drops.

Next, the PKB 3 will be described.

The PKB 3 is connected to brake wires 31R and 31L and brake calipers of the rear wheels 4RL and 4RR. This PKB 3 generates braking force, i.e., a second braking force, by having an actuator, which includes a gear mechanism and a motor, not shown, that operates in response to a second drive signal from the brake control ECU 1, drive the brake calipers of the left and right rear wheels 4RR and 4RL via the brake wires 31R and 31L. The motor of the PKB 3 is driven by duty control to run in the normal direction or the reverse direction depending on the second drive signal. Accordingly, the value of the second braking force is able to be controlled.

At this time, a braking force in accordance with the duty ratio is generated and when a target braking force is reached, the motor of the PKB 3 locks. When it is detected that the motor is locked, the drive current to the motor is cut off, i.e., the second drive signal is cancelled, such that control of the PKB 3 is stopped (i.e., prohibited). When control of the PKB 3 is stopped, the gear mechanism does not move so the second braking force is maintained and a locked state occurs.

In addition to being driven in response to the second drive signal from the brake control ECU 1, the PKB 3 is also driven by the brake control ECU 1 outputting the second drive signal to the PKB 3 based on an operation signal output when the driver operates a parking brake switch, not shown, ON/OFF.

The wheel speed sensors 5FL to 5RR are provided on corresponding vehicle wheels, as shown in FIG. 2, so as to enable the rotation speed of each wheel to be detected. The output signals from the sensors are input directly to the brake control ECU 1. Semiconductor type speed sensors using a hall element, for example, are used for the wheel speed sensors 5FR, 5FL, 5RR, and 5RL so that a reliable wheel rotation pulse can be obtained even at low speeds, which enables an accurate vehicle speed to be detected even at parking speeds.

The engine control ECU 7 controls engine output by adjusting the fuel injection value according to the running state based on an accelerator opening value signal indicative of an accelerator operating value from an accelerator operating value sensor 52, the engine speed, the coolant temperature, and the oxygen concentration in the exhaust gas, and the like, and then assigning a command value to an engine 70. Accordingly, the driving force of the left and right front wheels 4FR and 4FL, which are rotatably driven via an automatic transmission (AT) 71 and wheel axles 72R and 72L, is adjusted.

The AT 71 is a well-known apparatus which includes a torque converter that transmits rotation of the engine 70 to the wheel axles 72R and 72L, and is controlled to shift by a control apparatus, not shown. In the present embodiment, parking assist control is performed by actively using the state in which the vehicle travels at a low speed from the creep effects (hereinafter simply referred to as "creep running"). With regard to the control of the AT 71, a description of the control apparatus of the AT 71 will be omitted because it does not particularly relate to the present invention.

That is, in the present embodiment, the engine control ECU 7 runs the vehicle VL in a constant speed mode, combining control of the driving force by either increasing the engine output from an idling state or decreasing the output to the idling state, with control of the braking force by the brake control ECU 1, in response to an engine output adjusting signal from the brake control ECU 1.

The peripheral monitoring control ECU 8 calculates a braking distance L, which is the distance to a location where the vehicle VL should stop, based on a distance x to an obstacle measured by an obstacle sensor 54 as a distance measuring sensor, to be described later, which is one of the various sensors 50. The peripheral monitoring control ECU 8 then outputs the obtained braking distance L to the brake control ECU 1 as a brake request value.

The warning indication and alarm device 9 includes a warning indicator such as a lamp or display and an alarm unit such as a buzzer or speaker. The warning indication and alarm device 9 informs the driver that, for example, various controls are being executed by illuminating the lamp, indicating in the display indication, or sounding the audible alarm using the buzzer or the speaker.

The various sensors 50 include a steering angle sensor 51, the accelerator operating value sensor 52, the brake operating value sensor 53, and the obstacle sensor 54.

The steering angle sensor 51 detects the steering angle of the steering wheel. The accelerator operating value sensor 52 detects the operating value of the accelerator pedal. The brake operating value sensor 53 detects the operating value of the brake pedal.

The obstacle sensor 54 detects obstacles near the vehicle VL. A laser radar, a camera mounted on the vehicle, corner sonar or the like may be used for this obstacle sensor 54.

For example, when corner sonar is used for the obstacle sensor 54, it measures the distance x to obstacles in front and in back of the vehicle using, for example, corner sonar mounted on a bumper on a front portion and a rear portion of the vehicle, and sends a signal derived from that distance x to the brake control ECU 1 and other brake request output units via the in-vehicle LAN bus 6. The derived signal of the distance x corresponds to the relative speed with respect to an obstacle such as a vehicle running in front or in back of the vehicle.

A sensor check is then performed to detect whether an abnormality has occurred in the obstacle sensor 54 used for the distance measuring sensor structured in this way. This sensor check includes an electrical failure check of the obstacle sensor 54 itself and an electrical failure check of a signal processing circuit (corresponding to the peripheral monitoring control ECU 8 and the like in the present embodiment) which processes the detection signal from the obstacle sensor 54.

For example, if no detection signal is output from the obstacle sensor 54, or, in a case where the obstacle sensor 54 is provided with a diagnosis function, if a diagnostic signal that differs from the normal detection signal is output, an electrical failure of the obstacle sensor 54 itself is determined to have occurred, and an abnormality is detected.

Further, if for example a calculation is unable to be performed by the signal processing circuit or a control signal is unable to be output from the signal processing circuit, an electrical failure is determined to have occurred in the signal processing circuit of the obstacle sensor 54, and an abnormality is detected.

If an abnormality is detected during this abnormality check, an abnormality detection flag in memory, not shown, provided in the peripheral monitoring control ECU 8 or the brake control ECU 1 is set, thus making it possible to confirm that an abnormality has occurred.

The brake request output portion 80 corresponds to a brake request output unit and includes a traffic tracking ECU 81, a vehicle-to-vehicle distance control ECU 82, and a doze prevention ECU 83.

The traffic tracking ECU 81 detects a braking and stopped state of a preceding vehicle when there is traffic congestion, and calculates, based on the vehicle speed of the host vehicle VL, a target deceleration [for example, a deceleration of 0.23 G (G: gravitational acceleration)] for maintaining a vehicle-to-vehicle distance or stopping the host vehicle VL at a position a predetermined distance from the preceding vehicle without the host vehicle VL rear-ending the preceding vehicle. The traffic tracking ECU 81 then outputs the calculation results to the brake control ECU 1 via the in-vehicle LAN bus 6 as an ECU request value.

Accordingly, in the brake control ECU 1, with a deceleration of 1 G corresponding to a brake pressure of 10 MPa (Pa: Pascal, unit of pressure), for example, the deceleration indicated by the ECU request value is then converted to a brake pressure (i.e., brake hydraulic pressure), the value of which is then evaluated.

The vehicle-to-vehicle distance control ECU 82 detects the distance and the relative speed between the host vehicle VL and an obstacle such as a vehicle in front or in back of the vehicle. The vehicle-to-vehicle distance control ECU 82 performs drive control by the engine control ECU 7 and brake control by the brake control ECU 1 so as to maintain the vehicle-to-vehicle distance to the obstacle at a predetermined value that has been either set in advance or reset by the driver. Further, the vehicle-to-vehicle distance control ECU 82 outputs a target braking distance (for example, stop in 28 m) to the brake control ECU 1 as an ECU request value. Also, because of the possibility of a pedestrian or the like suddenly running out in the vehicle traveling direction, a brake request is output which enables sudden braking when the distance between the vehicle and the obstacle in front or in back of the vehicle decreases suddenly. The distance to the obstacle in front or in back of the vehicle is detected by the obstacle sensor 54.

Accordingly, in the brake control ECU 1, a target deceleration is obtained from the current vehicle speed and the target braking distance or a maximum deceleration for sudden braking is set. That target deceleration or maximum deceleration is then converted to a brake pressure and the value is then evaluated, just as described above.

The doze prevention ECU 83 detects the driving operation state or the physiological state of the driver, determines whether the driver is dozing off, and issues an alarm such as a buzzer to prompt the driver awake and performs instant braking off and on. In the present embodiment, the doze prevention ECU 83 assigns as an ECU request value to the brake control ECU 1 a value that changes over time for the target braking fluid pressure in order to awaken the driver. The change over time in the braking force can have a triangular wave shape, for example.

The parking assist control apparatus according to the present embodiment is structured as described above. With a parking assist control apparatus of this kind of structure, parking assist control is executed when a switch, not shown, for starting the parking assist control is pushed and a parking assist mode is set. More specifically, the various controls such as the parking assist control and the failsafe control are executed by the brake control ECU 1, the engine control ECU 7, and the peripheral monitoring ECU 8 based on the detection signals from the wheel speed sensors 5FL to 5RR, the W/C pressure sensors 19a, 19b, 29a and 29b, and the various sensors 50, as well as the target deceleration output as an ECU request value from the brake request output portion 80, and the like.

Then, if the distance x between the vehicle VL and the obstacle is relatively large when the parking assist control is executed, the vehicle VL is adjusted so that it creeps at a target speed (i.e., a creep speed) according to the brake operating value and the road gradient by operating in the constant speed mode. When the distance x to the obstacle becomes smaller, a switch is made to operation in a stop-vehicle mode and the vehicle VL is adjusted to decelerate by generating a braking force so that the braking distance set according to the vehicle speed is achieved.

Continuously, the failsafe control executed during this parking assist control will now be described.

When an abnormality occurs in the obstacle sensor 54 during parking assist control, the obstacle sensor 54 may no longer be able to accurately detect the distance x such that appropriate parking assist control may be unable to be executed. This failsafe control routine therefore cancels the parking assist control and stops the vehicle VL when an abnormality has been detected in the obstacle sensor 54 by the sensor check.

Figure 3:
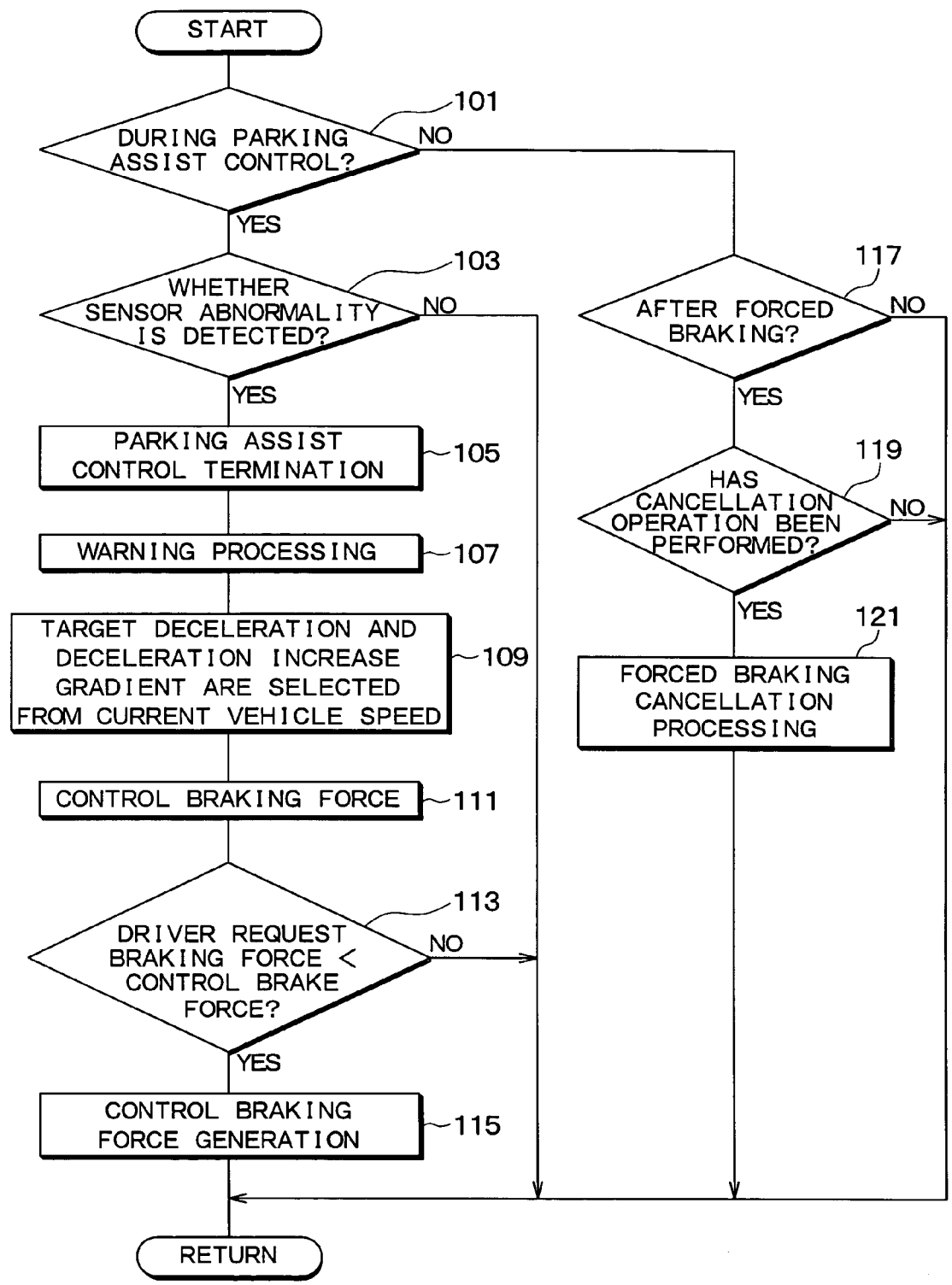
FIG. 3 is a flowchart showing the details of a failsafe control routine executed by a brake control ECU.

FIG. 3 is a flowchart of a failsafe control routine. The failsafe control routine illustrated in this flowchart is executed by the brake control ECU 1 at predetermined control cycles when a switch, not shown, for starting the parking assist control in the vehicle is turned on.

First, at 101, it is determined whether parking assist control is currently being executed. For example, when the parking assist control is being executed, a flag in memory, not shown, provided in the brake control ECU 1 is set. The determination can be made by confirming whether that flag is set or reset.

When the determination at 101 is yes, it means that the parking assist control is currently being executed so that the routine proceeds to the processing at 103.

At 103, it is determined whether an abnormality of the obstacle sensor 54 has been detected. This determination is made based on whether the abnormality detection flag in memory, not shown, provided in the peripheral monitoring control ECU 8 or the brake control ECU 1 is set or not, as described above. If the abnormality detection flag is not set, it means that there are no problems. Thus, if the determination at 103 is no, the routine is terminated. If the determination at 103 is yes, the routine proceeds to the processing at 105.

At 105, processing is performed for ending the parking assist control because of the possibility that the parking assist control is unable to be executed appropriately due to, for example, an abnormality in the obstacle sensor 54 such that the distance x is unable to be accurately obtained.

Continuously, warning processing is executed at 107. In this processing, a control signal indicating that failsafe control has been executed is output to the warning indication and alarm device 9 in order to issue a warning via the audible alarm and the lamp or display indication. Accordingly, an alarm is issued by the warning indication and alarm device 9 in the form of lamp illumination or the display indication and the audible alarm via the buzzer or the speaker, thus notifying the driver that an abnormality has occurred in the obstacle sensor 54 and that failsafe control will be executed.

At 109, the target deceleration and the deceleration increase gradient are selected from the current vehicle speed. For the current vehicle speed, for example, a vehicle speed obtained during parking assist control based on signals from the wheel speed sensors 5FL to 5RR can be used, or a vehicle speed obtained previously by another ECU can be used. The deceleration increase gradient is selected using a deceleration increase gradient map according to the vehicle speed set beforehand in the brake control ECU 1.

The routine proceeds to the processing at 111, where the control braking force for obtaining the selected deceleration increase gradient is calculated. The calculation of the brake pressure for the deceleration is the same as described above.

Next, the routine proceeds to the processing at 113, where it is determined whether the control braking force is large with respect to the braking force required by the driver (hereinafter simply referred to as "driver request braking force"). The driver request braking force in this case means the braking force generated in accordance with a depression of the brake pedal by the driver. If the control braking force is greater than this driver request braking force, it means that a braking force greater than that required by the driver is necessary so that the routine proceeds to the processing at 115 in order to generate the control braking force. If, on the other hand, the driver request braking force is greater than the control braking force, it means that the braking force required by the driver is greater than the braking force required by the failsafe control so that the driver's brake request is respected and priority is given to the driver request braking force. In this case, the routine skips the processing at 115 and terminates.

At 115, forced braking processing is executed to generate the control braking force. More specifically, a first drive signal instructing a brake pressure to be generated which corresponds to the control braking force is output. Accordingly, the value of the first braking force generated by the hydraulic brake unit 2 is adjusted such that control braking force is generated and the vehicle VL is stopped. When this forced braking processing is executed, a forced braking flag, not shown, provided in the brake control ECU 1 is set to indicate that this processing has been executed.

If, on the other hand, the determination at 101 is no, it is determined that the parking assist control is not being performed or that the parking assist control has been forcibly ended, and the routine proceeds to the processing at 117.

At 117, it is determined whether the forced braking processing had already been terminated or not. This determination is made based on whether the forced braking flag, described above, is set. If the forced braking flag is set, the routine proceeds to the processing at 119. If the forced braking flag has been reset, the routine is terminated. For example, during normal running, in which the parking assist control is not being executed, or when the vehicle VL has been stopped by braking force generated based on a brake pedal operation by the driver even if an abnormality has occurred in the obstacle sensor 54 during parking assist control, the determination at 117 is no.

At 119, it is determined whether a cancellation operation has been performed after the forced braking control processing was executed. A cancellation operation in this case refers to, for example, an accelerator operation being performed or stopping the vehicle VL for a certain period of time or the like. Whether or not such a cancellation operation has been performed is determined based on a detection signal from the wheel speed sensors 5FL to 5RR or a detection signal from the accelerator operating value sensor 52.

If the determination at 119 is yes, the routine proceeds to the processing at 121 and the forced braking cancellation processing is executed. Here, the first drive signal is cancelled in order to cancel the brake pressure generated by the hydraulic brake unit 2. Also, if the determination at 119 is no, the routine is terminated. In this case, the brake pressure generated by the hydraulic brake unit 2 set in the forced braking processing is maintained.

As described above, the parking assist control apparatus of the present embodiment automatically stops the vehicle VL when an abnormality occurs in the obstacle sensor 54 during parking assist control. It is thus possible to realize a parking assist control apparatus provided with a failsafe function that is able to respond to an abnormality if one is detected in the obstacle sensor 54 when parking assist control is executed.

Also, with the failsafe control of the present embodiment, a deceleration increase gradient is selected from the vehicle speed, and the vehicle VL is stopped after being decelerated at a target deceleration that enables the selected deceleration increase gradient to be achieved. Therefore, the vehicle VL can be stopped without sudden braking.

When the driver request braking force is greater than the control braking force for achieving the selected deceleration increase gradient, however, the driver's brake request can also be respected by enabling the driver request braking force to be obtained.

Second Embodiment

Next, a second embodiment of the present invention will be described. The present embodiment differs from the first embodiment in that the content of the failsafe control routine executed by the brake control ECU 1 has been modified. The structure and the like of the parking assist control apparatus according to the present embodiment are similar to that of the first embodiment. Thus, only the parts that differ will be described here.

In the first embodiment, the vehicle VL is forcibly stopped using the hydraulic brake unit 2 when an abnormality occurs in the obstacle sensor 54 which serves as the distance measuring sensor. In the present embodiment, however, the control mode is changed after it is determined whether to continue the parking assist control or forcibly stop the vehicle VL depending on the type of sensor abnormality.

Figure 4:
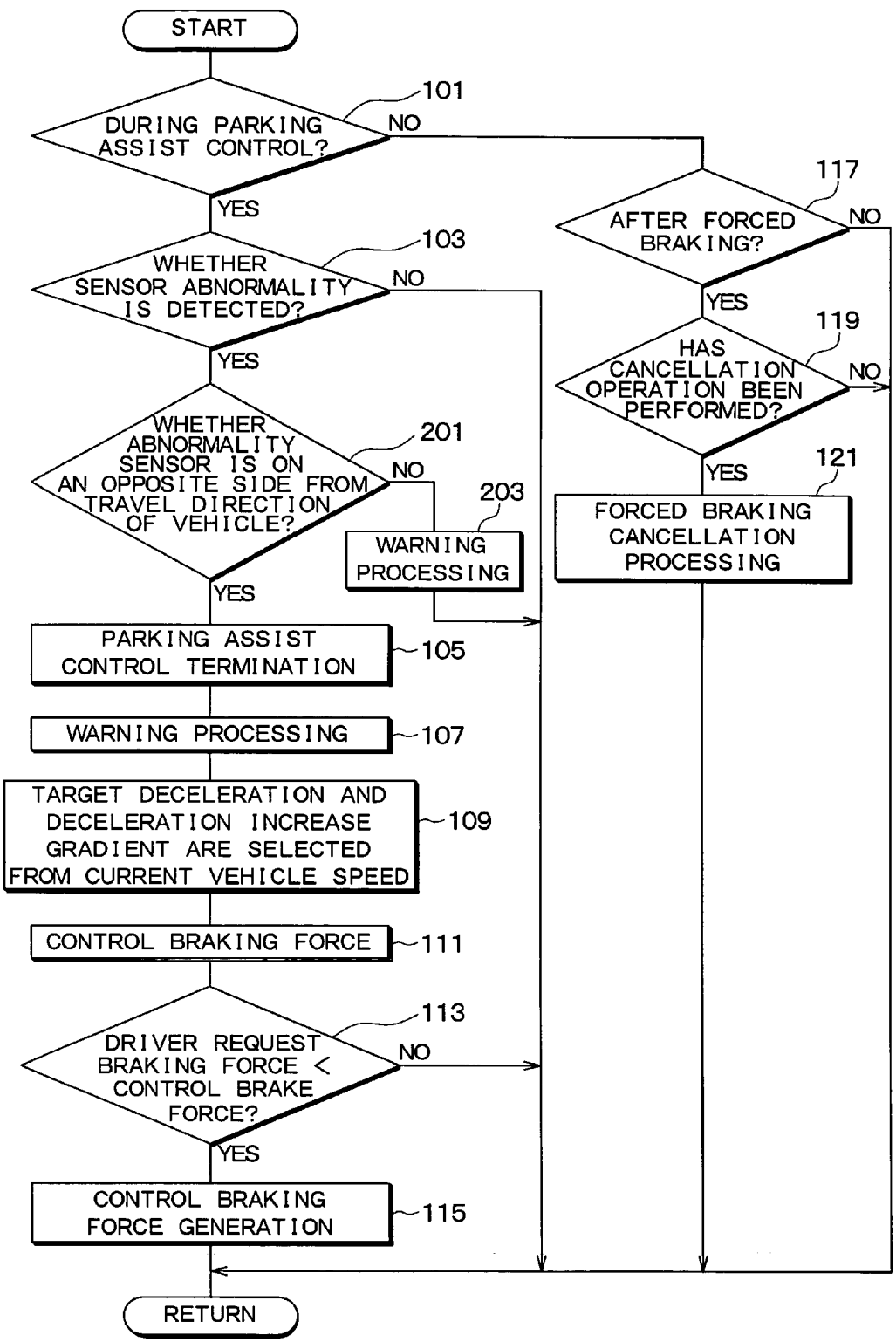
FIG. 4 is a flowchart showing the details of a failsafe control routine executed by a brake control ECU provided in a parking assist control apparatus according to a second embodiment of the present invention.

FIG. 4 is a flowchart illustrating a failsafe control routine executed by the brake control ECU 1 in the parking assist control apparatus according to the present embodiment.

At 101 and 103 shown in the drawing, processing similar to that at 101 and 103 in FIG. 3 shown in the first embodiment is executed. If an abnormality of the obstacle sensor 54 is detected at 103, the routine proceeds to the processing at 201, where the control mode is determined according to the kind of abnormality of the obstacle sensor 54. That is, at 201, it is determined whether the abnormality of the obstacle sensor 54 is detected on the same side as the travel direction of the vehicle VL or the opposite side from the travel direction.

This determination is made, for example, by setting the abnormality detection flag when an abnormality is detected during the abnormality check described in the first embodiment, recording the obstacle sensor 54 in which that abnormality was detected, and checking whether the obstacle sensor 54 in which that abnormality occurred is on the same side or the opposite side as the travel direction of the vehicle VL.

Thus, when the obstacle sensor 54 in which the abnormality was detected is on the opposite side from the travel direction of the vehicle VL, the routine proceeds to the processing at 203, where warning processing to the driver is performed. In this processing, a control signal indicating that an abnormality has occurred in the obstacle sensor 54 that is on the opposite side from the travel direction of the vehicle VL is output to the warning indication and alarm device 9 in order to issue a warning via an audible alarm and a lamp or display indication. Accordingly, the alarm is issued by the warning indication and alarm device 9 in the form of lamp illumination or the display indication and the audible alarm via the buzzer or the speaker, thus notifying the driver that an abnormality has occurred in the obstacle sensor 54.

If at 201, on the other hand, an abnormality is detected that is on the same side as the travel direction of the vehicle VL, the processing at 105 and thereafter is performed, just as in the first embodiment.

Also, at 101, even if parking assist control is not currently being executed, the processing at 117 and thereafter is performed in the first embodiment.

As described above, in the present embodiment, only in a case where the obstacle sensor 54 in which an abnormality was detected is on the opposite side from the travel direction of the vehicle VL is parking assist control continued while a warning to that effect is issued. Thus it is possible to continue executing parking assist control while alerting the driver to the fact that an abnormality has occurred in the obstacle sensor 54.

Third Embodiment

A third embodiment of the present invention will now be described. The present embodiment differs from the first embodiment in that it uses a parking assist control apparatus as a parking assist brake control apparatus that executes parking assist brake control as parking assist control, and that the content of the failsafe control routine executed by the brake control ECU 1 has been modified. The structure and the like of the parking assist brake control apparatus according to the present embodiment is similar to that of the first embodiment. Thus, only the parts that differ will be described here.

In the present embodiment, the structure itself of the parking assist brake control apparatus is similar to that in the first embodiment. However, the hydraulic brake unit 2 serves as a first brake mechanism of the present invention, and the PKB 3 serves as a second brake mechanism of the present invention.

In the present embodiment, an abnormality check to detect whether brake failure is occurring is performed in the hydraulic brake unit 2 which serves as the first brake mechanism in the parking assist brake control apparatus of the foregoing structure. This abnormality check includes both a hardware check and an electrical check.

The hardware abnormality check is performed by actuating the pressure increase control valves 14a, 14b, 24a, and 24b, the pressure decrease control valves 15a, 15b, 25a, and 25b, and the SM valves 18 and 28, as well as by driving the motor 20 to operate the pumps 17 and 27. If each of the hardware structures operates normally, it is determined that no abnormality has occurred. If the hardware structures fail to operate, an abnormality is detected. This kind of hardware abnormality check is performed, for example, during an initial check which is performed immediately after an ignition switch has been turned on, or when parking assist brake control is executed.

The electrical abnormality check is performed when the hardware abnormality check is performed, by detecting whether the brake control ECU 1, which generates control signals for operating the various hardware structures, is operating normally. That is, if the control signals for operating the various hardware structures are output normally, it is determined that no abnormality has occurred. If the control signals are not output normally, an abnormality is detected.

When an abnormality has been detected during this abnormality check, an abnormality detection flag in memory, not shown, provided in the brake control ECU 1 is set, thus making it possible to confirm that brake failure has occurred.

Control responding to brake failure is then performed during the parking assist brake control described in the first embodiment based on whether or not such brake failure has occurred.

Hereinafter, the failsafe control executed during this parking assist brake control will be described. The basic processing in the failsafe control is, however, similar to that in the first embodiment so that the description will focus on different parts therebetween.

Because of the possibility that braking force may no longer be able to be generated by the hydraulic brake unit 2 if brake failure occurs during parking assist brake control, the failsafe control routine generates braking force by the PKB 3 when brake failure has been detected by the abnormality check.

Figure 5:
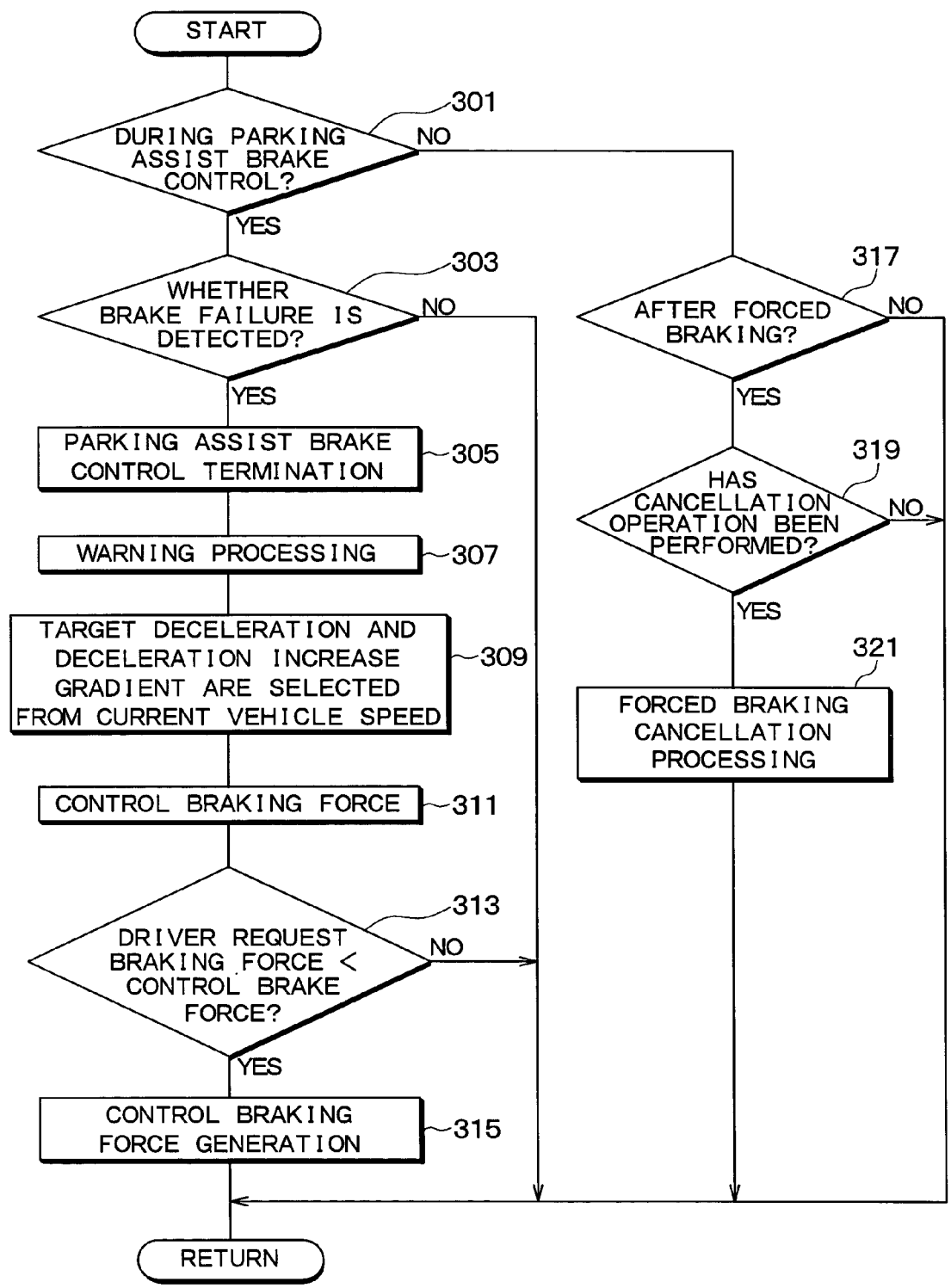
FIG. 5 is a flowchart showing the details of a failsafe control routine executed by a brake control ECU provided in a parking assist brake control apparatus according to a third embodiment of the present invention.

FIG. 5 is a flowchart illustrating a failsafe control routine. The failsafe control routine shown in this flowchart is executed in the brake control ECU 1 at predetermined control cycles when a switch, not shown, for starting parking assist brake control in the vehicle is turned on.

First, at 301, it is determined whether parking assist brake control is currently being executed. This determination is made according to a method similar to that at 101 in FIG. 3. If the determination at 301 is yes, it is determined that parking assist brake control is currently being executed and the routine proceeds to the processing at 303.

At 303, it is determined whether brake failure is detected. This determination is made based on whether an abnormality detection flag has been set in memory, not shown, provided in the brake control ECU 1 by the abnormality check performed when parking assist brake control is executed, as described above. If the abnormality detection flag is not set it means that there are no problems. Therefore, if the determination is no at 303, the routine is terminated. If the determination at 303 is yes, however, the routine proceeds to the processing at 305.

At 305, processing is executed to terminate the parking assist brake control because of the possibility that brake failure may have occurred and braking force may no longer be able to be generated by the hydraulic brake unit 2. Thus, the first drive signal output to generate braking force by the hydraulic brake unit 2 stops being output such that parking assist brake control terminates.

Continuously, the routine proceeds to the processing at 307 where warning processing is executed. This processing is performed by a method similar to that at 107 in FIG. 3. Accordingly, the driver is alerted to the fact that the brakes have failed and failsafe control will be executed.

Next, at 309 to 313, processing similar to that at 109 to 113 in FIG. 3 is executed.

If the determination at 313 is yes, the routine proceeds to the processing at 315, where forced braking processing is executed to generate control braking force. More specifically, a second drive signal is output which indicates that brake pressure corresponding to the control braking force is to be generated. Accordingly, the value of the second braking force generated by the PKB 3 is adjusted such that the control braking force is generated. When this forced braking processing is executed, a forced braking flag, not shown, provided in the brake control ECU 1 is set to indicate that the processing has been executed.

If, on the other hand, the determination at 301 is no, it is determined that either parking assist brake control is not being performed or that parking assist brake control has been forcibly ended so processing similar to that at 117 to 119 in FIG. 3 is executed at 317 to 319.

If the determination at 319 is yes, the forced braking flag is reset and the routine proceeds to the processing at 321, where forced braking cancellation processing is executed. Here, the second drive signal is cancelled in order to cancel the brake pressure generated by the PKB 3. Also, if the determination at 319 is no, the routine is terminated. In this case, the brake pressure generated by the PKB 3 set by the forced braking processing is maintained.

As described above, the parking assist brake control apparatus of the present embodiment automatically stops the vehicle VL if brake failure occurs during parking assist brake control. It is thus possible to realize a parking assist brake control apparatus provided with a failsafe function that is able to respond to brake failure if brake failure is detected when parking assist brake control is executed.

Also, with the failsafe control of the present embodiment, a deceleration increase gradient is selected from the vehicle speed and the vehicle VL is stopped after being decelerated at a target deceleration that enables the selected deceleration increase gradient to be achieved. Therefore, the vehicle VL can be stopped without sudden braking.

However, when the driver request braking force is greater than the control braking force for achieving the selected deceleration increase gradient, the driver's brake request to brake can also be respected by enabling the driver request braking force to be obtained.

Fourth Embodiment

Next, a fourth embodiment of the present invention will be described. The present embodiment differs from the third embodiment in that the content of the failsafe control routine executed by the brake control ECU 1 has been modified. The structure and the like of the parking assist brake control apparatus according to the present embodiment are similar to that of the third embodiment. Thus, only the different parts therebetween will be described here.

In the third embodiment the vehicle VL is forcibly stopped using the PKB 3 when brake failure has occurred. In the present embodiment, however, the control mode is changed after it is determined whether to continue the parking assist brake control or forcibly stop the vehicle VL depending on the type of brake failure.

Figure 6:
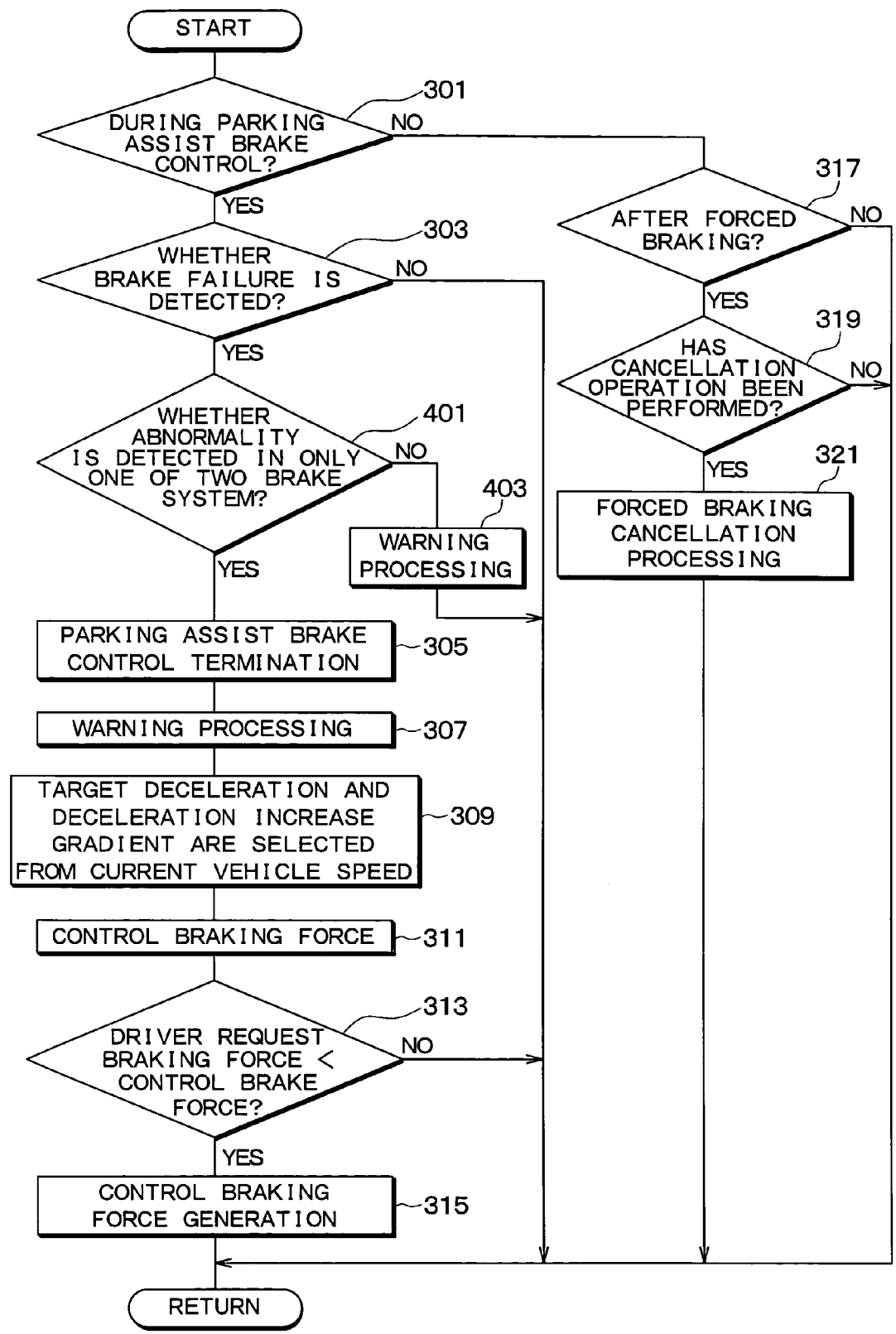
FIG. 6 is a flowchart showing the details of a failsafe control routine executed by a brake control ECU provided in a parking assist brake control apparatus according to a fourth embodiment of the present invention.

FIG. 6 is a flowchart illustrating a failsafe control routine executed by the brake control ECU 1 in the parking assist brake control apparatus according to the present embodiment.

At 301 and 303 shown in the drawing, processing similar to that at 301 and 303 in FIG. 5 shown in the third embodiment is executed. If brake failure is detected at 303, the routine proceeds to the processing at 401, where the control mode is determined according to the kind of brake failure. That is, at 401 it is determined whether the brake failure is a failure in which an abnormality is detected in only one of the two brake systems provided in the hydraulic brake unit 2, or a failure in which an abnormality is detected in both of those systems.

This determination is made, for example, by setting the abnormality detection flag when an abnormality is detected during the abnormality check described in the third embodiment, recording the object in which the abnormality was detected, and checking which of the brake system of the two brake systems that object belongs to.

Thus, when the object in which an abnormality is detected belongs to only one of the two brake systems, the routine proceeds to the processing at 403, where warning processing to the driver is performed. In this processing, a control signal which indicates that brake failure has occurred in one of the two brake systems provided in the hydraulic brake unit 2 is output to the warning indication and alarm device 9 to issue a warning via an audible alarm and a lamp or display indication. Accordingly, an alarm is issued by the warning indication and alarm device 9 in the form of lamp illumination or a display indication and an audible alarm via a buzzer or speaker, thus notifying the driver that brake failure has occurred.

If at 401, on the other hand, an abnormality is detected in both of the brake systems, the processing at 305 and thereafter is performed, just as in the third embodiment.

Also, at 301, even if parking assist brake control is not currently being executed, the processing at 317 and thereafter in the third embodiment is performed.

As described above, in the present embodiment, only when an abnormality has been detected in only one of the two brake systems provided in the hydraulic brake unit 2 is parking assist control continued while a warning to that effect is issued. It is therefore possible to continue executing parking assist brake control while alerting the driver to the fact that brake failure has occurred.

During parking assist brake control, the vehicle VL creeps at a low speed so that even if brake pressure from only one brake system of the hydraulic brake unit 2 is generated, the vehicle speed can still be sufficiently reduced so that no problems will occur even if control such as that of the present embodiment is performed.

Fifth Embodiment

Next, a fifth embodiment of the present invention will be described. The present embodiment differs from the third embodiment in that the content of the failsafe control routine executed by the brake control ECU 1 has been modified. The structure and the like of the parking assist brake control apparatus according to the present embodiment are similar to that of the third embodiment. Thus, only the different parts therebetween will be described here.

In the third embodiment, when brake failure occurs, the vehicle VL is forcibly stopped using the PKB 3. In the fourth embodiment, however, the speed of the vehicle VL is adjusted using the PKB 3 and parking assist brake control continues.

Figure 7:
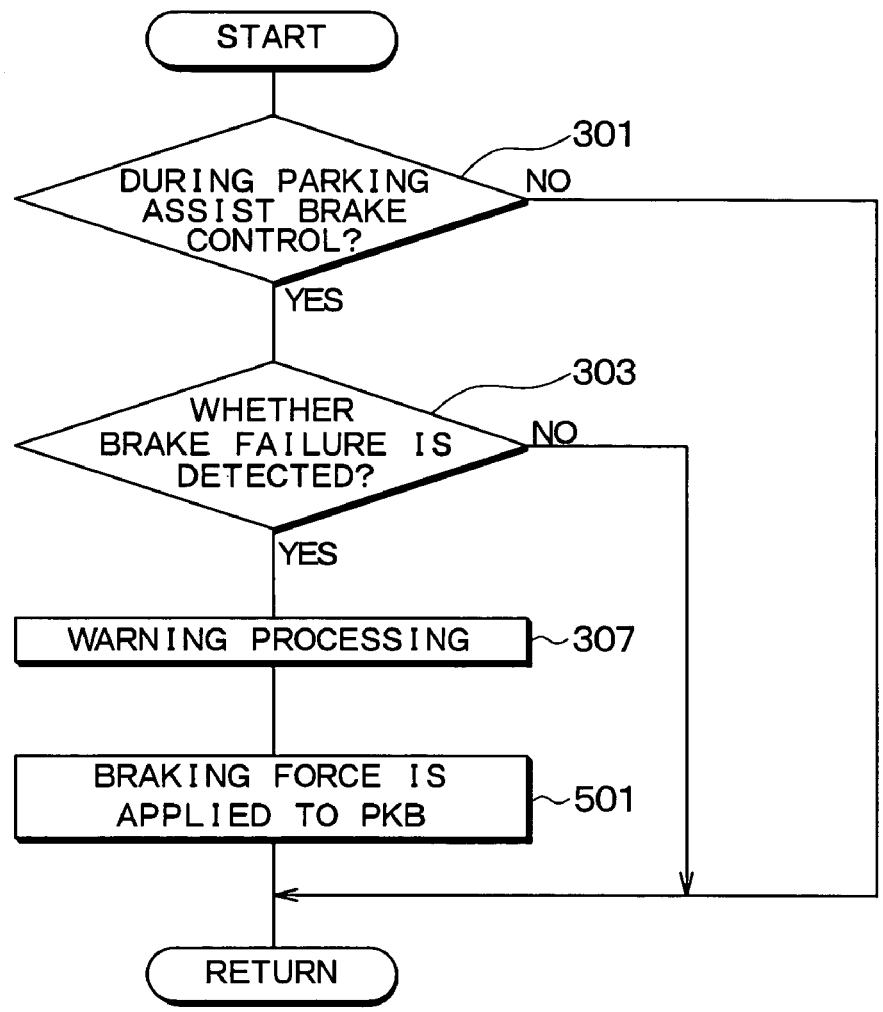
FIG. 7 is a flowchart showing the details of a failsafe control routine executed by a brake control ECU provided in a parking assist brake control apparatus according to a fifth embodiment of the present invention.

FIG. 7 is a flowchart illustrating a failsafe control routine executed by the brake control ECU 1 in the parking assist brake control apparatus according to the present embodiment.

At 301 and 303 shown in the drawing, processing similar to that at 301 and 303 in FIG. 5 shown in the third embodiment is executed.

Then, if it is determined at 303 that brake failure has occurred, the routine proceeds to the processing at 307, where warning processing is performed, without performing the processing at 305 in FIG. 5 in the third embodiment.

Then the routine proceeds to the processing at 501, where a second drive signal is output which corresponds to braking force applied by the PKB 3 necessary to generate the target deceleration determined in the parking assist brake control so that creep running can be performed. Thus, braking force is generated in the wheels 4RL and 4RR by the PKB 3 so the creep running determined in the parking assist brake control is realized.

As described above, the present embodiment makes it possible to continue parking assist brake control by generating braking force with the PKB 3 when brake failure occurs in the hydraulic brake unit 2. When a first brake mechanism and a second brake mechanism which serve as braking force apply mechanisms are provided in this way, the parking assist brake control is able to be continued because the second brake mechanism can be used in the event that the first brake mechanism, which is normally used in the parking assist brake control, fails.

OTHER EMBODIMENTS

In the second embodiment, parking assist control is continued only when the obstacle sensor 54 in which an abnormality has occurred is on the opposite side from the travel direction of the vehicle VL. Alternatively, however, parking assist control may also be continued only when the obstacle sensor 54 in which an abnormality has occurred is both on the opposite side from the travel direction of the vehicle VL and on a side of the vehicle where the wheels are on the inside of a turn.

Figure 8:
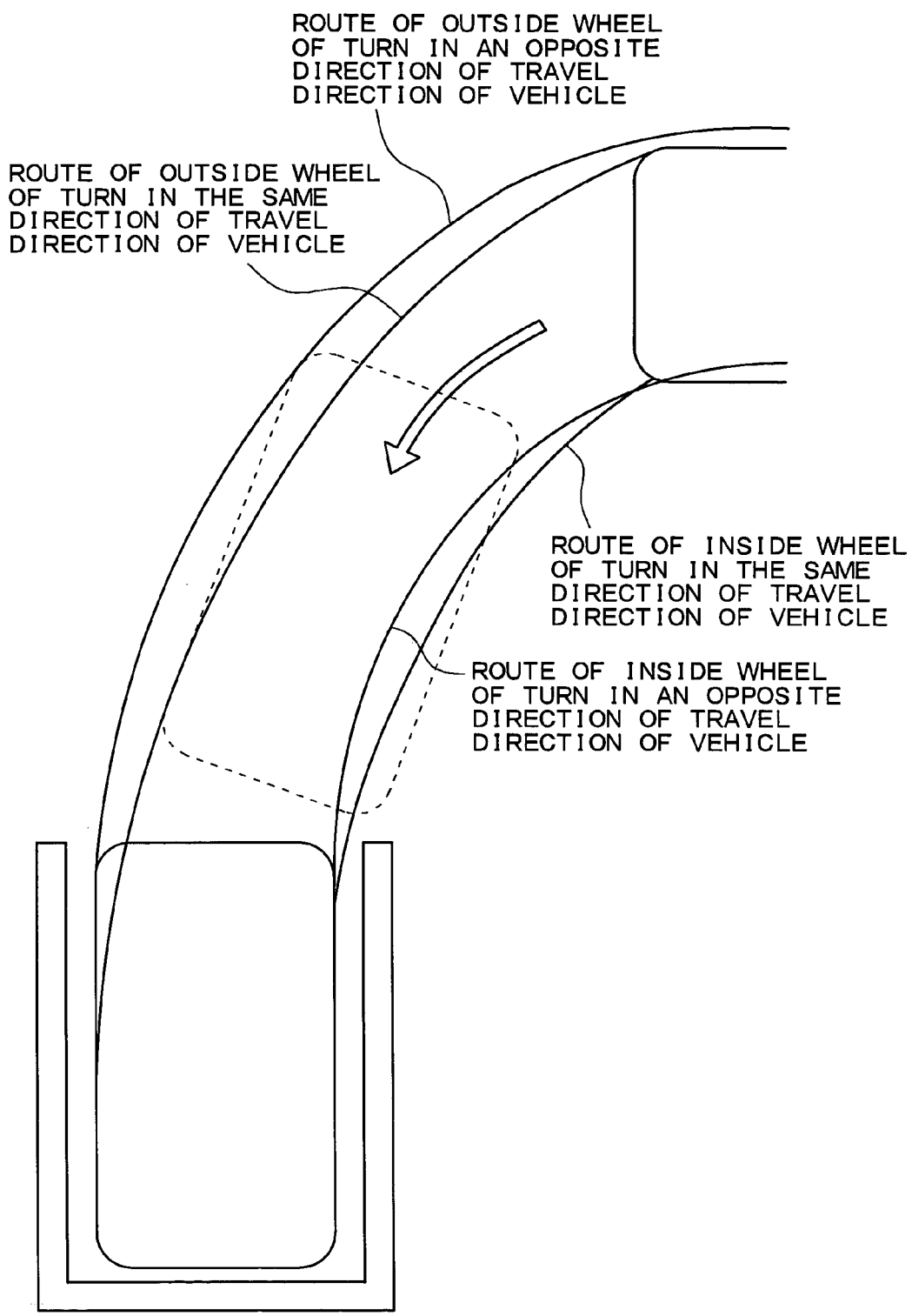
FIG. 8 is a view illustrating a path of travel of a vehicle during parking assist control.

For example, even if the obstacle sensor 54 in which an abnormality has occurred is on the opposite side of the travel direction of the vehicle VL, as indicated by the path of the vehicle VL during parking assist control shown in FIG. 8, depending on the turning state, the vehicle body on the side where the wheels are on the outside of the turn may stick out from the path of travel of the leading edge portion of the vehicle VL in the travel direction of the vehicle VL. Accordingly, when it is no longer possible to accurately detect the distance x with the obstacle sensor 54 on the side where the wheels are on the outside of the turn, there is a possibility that the portion that is sticking out may contact an obstacle. Thus, it is preferable to continue the parking assist control only when the obstacle sensor 54 in which an abnormality has occurred is on the opposite side from the direction in which the vehicle VL is traveling and on the side of the vehicle VL where the wheels are on the inside of the turn, as described above.

Furthermore, when plural kinds obstacle sensors 54 are used in combination, e.g., when corner sonar and a camera mounted on the vehicle VL are used together, and one kind of obstacle sensor 54 which is functioning normally is able to cover the detection area of another obstacle sensor 54 in which an abnormality has occurred, the parking assist control may be continued based on detection signals from the one kind of obstacle sensor 54 which is functioning normally.

In the foregoing embodiments, the braking force apply mechanism (i.e., the first and second brake mechanisms) includes the hydraulic brake 2 and the PKB 3. However, the braking force apply mechanism is not necessarily restricted to these structures as long as it is able to automatically generate braking force. For example, an electrical brake may be applied to the braking force apply mechanism (i.e., the first and second brake mechanisms). Furthermore, when another structure, such as a regenerative brake, is included as a braking force apply mechanism, the control braking force may also be generated by a combination of this and those described above.

Also, in the foregoing embodiments, the failsafe control routine is executed by the brake control ECU 1, but it does not necessarily have to be the brake control ECU 1. In particular, when there is an integrated ECU or the like that comprehensively performs various controls in a vehicle where research has been advancing in recent years, that integrated ECU may execute the failsafe control routine.

Further, the failsafe control routine may also be executed by a plurality of ECUs.

The processing shown in each drawing corresponds to a mechanism which executes the various kinds of processing.

While the above description is of the preferred embodiments of the present invention, it should be appreciated that the invention may be modified, altered, or varied without deviating from the scope and fair meaning of the following claims.

What is claimed is:

1. A parking assist control apparatus which executes a parking assist control that controls a speed of a vehicle at a predetermined speed by applying a braking force using a braking force apply mechanism capable of applying the braking force to wheels of the vehicle against a driving force generated thereto, irrespective of an intention of a driver, when a parking assist mode is set for assisting the driver with parking the vehicle, the parking assist control apparatus comprising:

an abnormality detection unit which detects an abnormality in a vehicle side device which is used in executing the parking assist control, wherein the abnormality detection unit receives a detection signal indicative of an abnormal state of a distance measuring sensor serving as the vehicle side device and detects an abnormality of the distance measuring sensor; and a vehicle brake control mechanism which stops the vehicle by outputting an instruction signal to the braking force apply mechanism and generating the braking force when the abnormality detection unit detects an abnormality, wherein the parking assist control is for assisting a driver to park the vehicle at a location where the vehicle should stop using a signal of the distance measuring sensor for detecting the distance to an obstacle at a periphery of the vehicle.

2. The parking assist brake apparatus according to claim 1, wherein
the braking force apply mechanism includes a first brake mechanism used during execution of the parking assist brake control and a second brake mechanism that is different from the first brake mechanism and is capable of applying the braking force to the wheels of the vehicle irrespective of the intention of the driver;
the abnormality detection unit detects an abnormality of the first brake mechanism serving as the vehicle side device; and
the vehicle brake control mechanism runs the vehicle at a predetermined speed corresponding to the parking assist control or stops the vehicle by outputting the instruction signal to the second brake mechanism and generating the braking force when the abnormality detection unit detects an abnormality in the first brake mechanism.

3. The parking assist brake apparatus according to claim 2, wherein the vehicle brake control mechanism changes whether to output the instruction signal to the second brake mechanism and generate the braking force, or generate the braking force with the first brake mechanism without outputting the instruction signal to the second brake mechanism, depending on the location where the abnormality of the first brake mechanism occurred.

4. The parking assist control apparatus according to claim 3, wherein when the first brake mechanism is structured so as to apply the braking force dividing the wheels provided on the vehicle into two brake systems, the vehicle brake control mechanism generates the braking force with the first brake mechanism without outputting the instruction signal to the second brake mechanism when the location where the abnormality of the first brake mechanism occurred is in only one of the two brake systems.

5. The parking assist brake apparatus according to claim 4, wherein the vehicle brake control mechanism outputs the instruction signal to the second brake mechanism and generates the braking force with the second brake mechanism when an abnormality has occurred in both brake systems of the first brake mechanism.

6. The parking assist brake apparatus according to claim 2, wherein the vehicle brake control mechanism outputs the instruction signal to an electric automatic parking brake serving as the second brake mechanism.

7. The parking assist control apparatus according to claim 1, wherein the vehicle brake control mechanism changes whether to output the instruction signal to the braking force apply mechanism and generate braking force depending on the location where the abnormality of the distance measuring sensor occurred.

8. The parking assist control apparatus according to claim 1, wherein the vehicle brake control mechanism does not output the instruction signal to the braking force apply mechanism if an abnormality of the distance measuring sensors has been detected in a distance measuring sensor that is positioned on the opposite side from the vehicle traveling direction.

9. The parking assist control apparatus according to claim 1, wherein the vehicle brake control mechanism does not output the instruction signal to the braking force apply mechanism if an abnormality of the distance measuring sensors has been detected in a distance measuring sensor that is positioned on the opposite side from the vehicle traveling direction and on the side of the vehicle where the wheels are on the inside of a turn.

10. A parking assist control system comprising:
the parking assist control apparatus according to claim 1, wherein the braking force apply mechanism includes an automatic pressure increase control mechanism which generates braking pressure on the wheels by automatically increasing the pressure, and
the vehicle brake control mechanism stops the vehicle by controlling the automatic pressure increase control mechanism by outputting the instruction signal and generating the braking force in the wheels by automatically increasing the pressure.

11. The parking assist brake apparatus according to claim 1, further comprising: a target deceleration detecting portion which receives data indicative of the speed of the vehicle and obtains a target deceleration based on the data indicative of that speed, wherein the vehicle brake control mechanism controls the braking force applied to the wheels by the braking force apply mechanism, and outputs the instruction signal and adjusts the braking force applied to the wheels by the braking force apply mechanism so that the target deceleration obtained by the target deceleration detecting portion is achieved.

12. The parking assist brake apparatus according to claim 1, further comprising: a deceleration increase gradient detection unit which receives data indicative of the speed of the vehicle and obtains a deceleration increase gradient based on that data, wherein the vehicle brake control mechanism controls the braking force applied to the wheels by the braking force apply mechanism, and outputs the instruction signal and adjusts the braking force applied to the wheels by the braking force apply mechanism so that the deceleration increase gradient obtained by the deceleration increase gradient detection unit is achieved.

* * * * *